(12) United States Patent
Kusafuka et al.

(10) Patent No.: US 7,471,069 B2
(45) Date of Patent: Dec. 30, 2008

(54) VOLTAGE GENERATOR DEVICE, MOTOR VEHICLE, CONTROL METHOD FOR THE VOLTAGE GENERATOR DEVICE, CONTROL METHOD FOR THE MOTOR VEHICLE, AND COMPUTER-READABLE RECORDING MEDIUM STORING PROGRAM FOR CAUSING COMPUTER TO EXECUTE THE CONTROL METHOD

(75) Inventors: Hironobu Kusafuka, Nishikamo-gun (JP); Shouji Abo, Toyota (JP); Yoshitaka Ojima, Toyota (JP); Yusuke Moritani, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 287 days.

(21) Appl. No.: 10/587,331

(22) PCT Filed: Feb. 11, 2005

(86) PCT No.: PCT/IB2005/000344

§ 371 (c)(1),
(2), (4) Date: Jul. 26, 2006

(87) PCT Pub. No.: WO2005/080774

PCT Pub. Date: Sep. 1, 2005

(65) Prior Publication Data

US 2007/0152641 A1   Jul. 5, 2007

(30) Foreign Application Priority Data

Feb. 13, 2004 (JP) .............................. 2004-037120

(51) Int. Cl.
*H02P 3/00* (2006.01)
*H02P 9/06* (2006.01)
*H02P 15/00* (2006.01)
*H02H 7/06* (2006.01)
*H02P 9/00* (2006.01)
*H02P 11/00* (2006.01)
*H02J 7/14* (2006.01)

(52) U.S. Cl. .............................. 322/11; 322/10; 322/28; 322/44; 320/123

(58) Field of Classification Search .................... 322/10, 322/11, 28, 44; 320/123
See application file for complete search history.

(56) References Cited

U.S. PATENT DOCUMENTS 3,784,893 A    1/1974  Rando .......................... 363/54

(Continued)

FOREIGN PATENT DOCUMENTS

DE            30 37 195 A1     4/1982

(Continued)

*Primary Examiner*—Julio C Gonzalez
*Assistant Examiner*—Pedro J Cuevas
(74) *Attorney, Agent, or Firm*—Kenyon & Kenyon LLP

(57) ABSTRACT

A voltage raising device that provisionally maintains an operation and function when there is an abnormality provided. If a battery voltage drops when an engine is restarted after an idle stop, the voltage raising device raises the output voltage to a target voltage by using a voltage detecting circuit and a current detecting circuit. If an overcurrent determining circuit detects overcurrent, a switching control circuit reduces the target voltage to perform a control. If overvoltage is output, for example, due to an increased target voltage caused by an internal setting deviation resulting from a failure, an overvoltage detecting circuit outputs a prohibition signal ENV to stop the switching operation. However, as long as the output voltage is not overvoltage, the voltage raising operation is allowed. Therefore, the possibility that the engine can be started at least once without a problem is increased.

14 Claims, 11 Drawing Sheets

U.S. PATENT DOCUMENTS

| | | | |
|---|---|---|---|
| 4,308,492 A * | 12/1981 | Mori et al. | 322/28 |
| 4,651,081 A * | 3/1987 | Nishimura et al. | 320/123 |
| 4,661,761 A * | 4/1987 | Katsumata | 322/28 |
| 4,682,044 A * | 7/1987 | Hotate et al. | 290/40 B |
| 4,831,322 A * | 5/1989 | Mashino et al. | 322/28 |
| 5,029,269 A | 7/1991 | Elliott et al. | 363/21.1 |
| 5,115,183 A * | 5/1992 | Kyoukane et al. | 320/123 |
| 5,122,723 A * | 6/1992 | Sato | 320/123 |
| 5,150,034 A * | 9/1992 | Kyoukane et al. | 322/10 |
| 5,163,399 A * | 11/1992 | Bolander et al. | 123/339.17 |
| 5,198,698 A * | 3/1993 | Paul et al. | 307/64 |
| 5,272,380 A * | 12/1993 | Clokie | 307/10.7 |
| 5,608,309 A * | 3/1997 | Hikita et al. | 322/28 |
| 5,710,699 A * | 1/1998 | King et al. | 363/132 |
| 5,719,485 A * | 2/1998 | Asada | 322/28 |
| 5,719,488 A * | 2/1998 | Mashino et al. | 322/28 |
| 5,737,197 A * | 4/1998 | Krichtafovitch et al. | 363/17 |
| 6,115,276 A * | 9/2000 | Mao | 363/127 |
| 6,316,919 B1* | 11/2001 | Sumimoto et al. | 322/28 |
| 6,388,421 B2* | 5/2002 | Abe | 320/104 |
| 6,700,214 B2* | 3/2004 | Ulinski et al. | 290/40 C |
| 6,700,802 B2* | 3/2004 | Ulinski et al. | 363/37 |
| 6,943,531 B2* | 9/2005 | Fukaya | 322/10 |
| 7,102,903 B2* | 9/2006 | Nakamura et al. | 363/98 |
| 7,120,037 B2* | 10/2006 | Komatsu et al. | 363/37 |
| 7,129,594 B2* | 10/2006 | Iwatani et al. | 290/40 C |
| 7,336,002 B2* | 2/2008 | Kato et al. | 307/10.6 |
| 7,394,227 B2* | 7/2008 | Uematsu et al. | 322/37 |
| 7,421,323 B2* | 9/2008 | Dannenberg et al. | 701/36 |
| 2004/0008009 A1* | 1/2004 | Fukaya | 322/44 |
| 2004/0140139 A1* | 7/2004 | Malik | 180/65.2 |
| 2006/0097577 A1* | 5/2006 | Kato et al. | 307/10.1 |
| 2006/0139012 A1* | 6/2006 | Iwatani et al. | 322/28 |
| 2007/0085511 A1* | 4/2007 | Uematsu et al. | 322/28 |
| 2007/0090805 A1* | 4/2007 | Mizuno et al. | 320/132 |
| 2007/0152641 A1* | 7/2007 | Kusafuka et al. | 322/28 |
| 2007/0175429 A1* | 8/2007 | Yanagida et al. | 123/179.14 |
| 2007/0241724 A1* | 10/2007 | Asada | 322/28 |

FOREIGN PATENT DOCUMENTS

| | | |
|---|---|---|
| EP | 0 483 744 A2 | 5/1992 |
| EP | 1 079 496 A2 | 2/2001 |
| JP | 01-234023 A | 9/1989 |
| JP | 11-107892 A | 4/1999 |
| JP | 2001-219798 A | 8/2001 |
| JP | 2002-038984 A | 2/2002 |
| JP | 2002-078239 A | 3/2002 |
| JP | 2002-218646 A | 8/2002 |
| JP | 2003-235105 A | 8/2003 |

\* cited by examiner

VOLTAGE GENERATOR DEVICE, MOTOR VEHICLE, CONTROL METHOD FOR THE VOLTAGE GENERATOR DEVICE, CONTROL METHOD FOR THE MOTOR VEHICLE, AND COMPUTER-READABLE RECORDING MEDIUM STORING PROGRAM FOR CAUSING COMPUTER TO EXECUTE THE CONTROL METHOD

INCORPORATION BY REFERENCE

This is a 371 national phase application of PCT/IB2005000344 filed 11 Feb. 2005, the content of which is incorporated herein by reference. The disclosure of Japanese Patent Application No. 2004-037120 filed on Feb. 13, 2004, including the specification, drawings and abstract is incorporated herein by reference in its entirety.

BACKGROUND OF THE INVENTION

1. Field of the Invention

The invention relates to a voltage generator device and a motor vehicle that supply an increased drive voltage to an electric load at the time of reduced power supply voltage, a control method for the voltage generator device, a control method for the motor vehicle, and a computer-readable recording medium storing a program for causing a computer to execute such a control method.

2. Description of the Related Art

Idle-stop vehicles that automatically stop the engine in a temporary fashion during a vehicle stop for a traffic signal or the like have been commercialized in recent years in order to reduce the fuel consumption and the exhaust emissions.

In such an idle-stop vehicle, the engine is automatically stopped provided that a condition for stopping the engine is met and that the vehicle is considered to be at a stop. Subsequently, when a condition for starting the engine is met, the engine is automatically started by a starter in order to get the idle-stop vehicle under way.

The starting of the engine by the starter requires a considerable amount of electric power. Therefore, the battery that serves as an electric power supply in the idle-stop vehicle is heavily discharged if the engine is frequently restarted, for example, during city street driving where frequent stops-and-goes are experienced.

If the engine is started from a stopped state when the battery is significantly discharged, the voltage of the battery temporarily falls to a great extent as the starter consumes electric power. The electric loads connected to the battery include electric loads having a CPU (central processing unit), for example, a car audio device, a car navigation system, etc. If the battery voltage falls below the reset voltage of a CPU (e.g., the power supply voltage of 8V of an electric load), there is possibility that the CPU may be reset and various settings retained during the running of the vehicle may be reset.

In order to resolve such troubles regarding electric loads, Japanese Patent Application Laid-Open Publication No. 2002-38984 discloses a related-art technology in which if the battery voltage reduces at the time of restart of the engine after an idle stop, the battery voltage is raised from the reduced level before being supplied to an electric load.

In a conventional arrangement incorporating a DC/DC converter or the like as a voltage generator device, operation of the voltage generator device is stopped for the purpose of circuit protection if an overvoltage or overcurrent exceeding a target value of voltage or current is detected. The stop of operation of this device is immediately followed by a sharp reduction of the output voltage supplied to the electric load, so that the following problem occurs, that is, the voltage compensation cannot be attained and the driving of the electric load cannot be appropriately controlled.

FIG. 10 is a waveform diagram for describing the output during overcurrent in a related-art technology. With reference to FIG. 10, an example case where a current value of 30 A or greater is set as an overcurrent will be described. Until the output current reaches 30 A, the output voltage remains at a constant voltage (e.g., 12 V) for compensating for the battery voltage fall. As the output current increases, the value of voltage of an overcurrent detection output for detecting an overcurrent state of the output current increases. If this value of voltage exceeds an overcurrent detection threshold value, the operation of the voltage generator device is stopped.

FIG. 11 is a waveform diagram for describing a control performed during overvoltage in the related-art technology. With reference to FIG. 11, let it assumed that the output voltage exceeds, for some cause, a target voltage (e.g., 12 V) of a voltage raising operation, and reaches an overvoltage prohibition threshold value (e.g., 16 V) that is close to the withstanding voltage of the electric load. In that case, an overvoltage stop output is output so as to stop the operation of the voltage generator device. Therefore, the input voltage is directly output. With regard to FIG. 11, it is to be noted that the output voltage is slightly lower than the input voltage due to the internal resistance of the voltage generator device.

Thus, since an ordinary voltage generator device, such as a DC/DC converter or the like, is designed taking a long-time continuous operation into consideration, the operation thereof is generally stopped, for example, for protection of an element or device, if an abnormality is detected. If such a control is applied to a voltage generator device that compensates for a voltage fall at the time of start of the engine after an idle stop, the problem of being unable to appropriately control the driving of a necessary electric load occurs also when the engine of a vehicle having a trouble is started in order to transport the vehicle to a repair shop.

Document EP 0 483 744 A2 discloses a current detection circuit of a power semiconductor device and a power converter using the circuit, wherein different detection levels of a load current can be detected. These detection levels are an overcurrent control level and/or a constant current control level. Said constant current control level can be a constant current value associated with chopper control or a value which judges an overload when a chopper control current exceeds a predetermined current level beyond a predetermined number of times. Said overcurrent control level can be a value corresponding to short-circuit-protection.

Further, a control circuit controls power semiconductor devices by decreasing a control voltage in a plurality of steps to zero in the case where an overcurrent detecting circuit outputs a detection signal corresponding to an overcurrent control level.

Further, document EP 1 079 496 A2 discloses an abnoramlity detection apparatus for a power supply circuit associated with an internal combustion engine that detects an abnormality that may occur in a power supply circuit, and controls the automatic stop and the automatic start of the engine based on the state of the power supply circuit. The state of charge/discharge of a battery determined based on the electric potential of a terminal located between the battery and a generator-motor or a load is compared with the current through the battery detected by an ammeter. If there is a contradiction therebetween, it is determined that an abnormality has occurred somewhere in the power supply circuit including the battery. When it is determined that the power supply circuit has an abnormality, the apparatus performs such a control as to prevent the automatic stop/start control in which the engine is automatically stopped if a predetermined condition is met, and in which the engine is automatically restarted when the condition is unmet after being met.

Still further document U.S. Pat. No. 3,784,893 discloses a high voltage shutdown protection circuit with bias arrangement to decrease the voltage shutdown point with increasing load. There, a current and voltage regulated DC to DC converter is designed with protection features to permit its operation in parallel with like DC to DC converters. The features are designed to assure shutdown protection against overcurrent and overvoltage conditions and to assure that each converter will contribute a current to the common load. The protection features include a selective high voltage shutdown to shut down only the converter causing an overvoltage and an overcurrent protection circuit to supersede the normal current regulation in response to a fault condition. A reverse current shutdown circuit protects the common load from faults and short circuits internal to the converter circuit. These protection features permit the converters to operate in parallel without shutting down the entire system should an individual converter malfunction.

SUMMARY OF THE INVENTION

The invention has been accomplished in order to solve the aforementioned problem. It is an object of the invention to provide a voltage generator device that prevents occurrence of a problem regarding an electric load by maintaining a voltage raising operation as much as possible and provide a motor vehicle equipped with the voltage generator device.

It is another object of the invention to provide control methods for the voltage generator device and the motor vehicle, and a computer-readable recording medium storing programs for causing a computer to execute the control methods.

The voltage generator device of the invention includes a voltage generating portion that receives an input voltage and generates a target voltage, an observing portion that observes an operating condition of the voltage generating portion, and a control portion. The control portion causes the voltage generating portion to maintain the voltage generating operation even if the operating condition observed by the observing portion is within a first region that is apart from a normal region. If the operating condition observed is within a second region that is further apart from the normal region than the first region is, the control portion causes the voltage generating portion to stop the voltage generating operation.

In the above-described voltage generator device, it is possible that the operating condition be within the first region if a current through the voltage generating portion is greater than a first value of current and is less than or equal to a second value of current, and that the operating condition be within the second region if the current through the voltage generating portion is greater than the second value of current.

Furthermore, the control portion may reduce a target value of voltage output by the voltage generating portion if a value of current through the voltage generating portion increases provided that the operating condition is within the first region.

Still further, it is possible that the operating condition be within the first region if a voltage output by the voltage generating portion is greater than a first value of voltage and is less than or equal to a second value of voltage, and that the operating condition be within the second region if the voltage output by the voltage generating portion is greater than the second value of voltage.

In this construction, the observing portion may include a voltage detecting circuit that detects the first value of voltage, and an overvoltage detecting circuit that detects the second value of voltage. The control portion may perform on the voltage generating portion a feedback control of setting an output of the voltage generating portion at the target voltage in accordance with an output of the voltage detecting circuit, and may stop the feedback control in accordance with an output of the overvoltage detecting circuit and may prohibit the voltage generating portion from performing the voltage generating operation.

The motor vehicle of the invention includes an electricity storage means, a voltage generator device that compensates for a fall of an output voltage of the electricity storage means, and an automatic engine stop control means that automatically controls stopping and starting of an engine. The voltage generator device includes a voltage generating portion that receives an input voltage and generates a target voltage, an observing portion that observes an operating condition of the voltage generating portion, and a control portion which causes the voltage generating portion to maintain a voltage generating operation even if the operating condition observed by the observing portion is within a first region that is apart from a normal region, and which causes the voltage generating portion to stop the voltage generating operation if the operating condition observed is within a second region that is further apart from the normal region than the first region is. The automatic engine stop control means prohibits an automatic stop of the engine if it is detected that the operating condition is within the first region.

The control method for a voltage generator device of the invention is a control method for a voltage generator device that includes a voltage generating portion that receives an input voltage and generates a target voltage. The control method includes the step of observing an operating condition of the voltage generating portion and causing the voltage generating portion to maintain a voltage generating operation even if the operating condition is within a first region that is apart from a normal region, and the step of causing the voltage generating portion to stop the voltage generating operation if the operating condition observed is within a second region that is further apart from the normal region than the first region is.

In the method described above, it is possible that the operating condition be within the first region if a current through the voltage generating portion is greater than a first value of current and is less than or equal to a second value of current, and that the operating condition be within the second region if the current through the voltage generating portion is greater than the second value of current.

In this method, a target value of voltage output by the voltage generating portion may be reduced if a value of current through the voltage generating portion increases provided that the operating condition is within the first region.

Furthermore, it is possible that the operating condition be within the first region if a voltage output by the voltage generating portion is greater than a first value of voltage and is less than or equal to a second value of voltage, and that the operating condition be within the second region if the voltage output by the voltage generating portion is greater than the second value of voltage.

Still further, in the above-described control method, the voltage generator device may include a voltage detecting circuit that detects the first value of voltage, and an overvoltage detecting circuit that detects the second value of voltage. The control method may further include the step of performing on the voltage generating portion a feedback control of setting an output of the voltage generating portion at the target voltage in accordance with an output of the voltage detecting circuit, and the step of stopping the feedback control in accordance with an output of the overvoltage detecting circuit and prohibiting the voltage generating portion from performing an operation.

The control method for a motor vehicle of the invention is a control method for a motor vehicle that includes a voltage generator device that compensates for a change in an output voltage of an electricity storage means. The control method includes the step of observing an operating condition of the voltage generator device and causing the voltage generator device to maintain a voltage generating operation even if the operating condition is within a first region that is apart from a normal region, the step of controlling stopping and starting of the engine in accordance with a state of the motor vehicle if the operating condition is within the normal region, and the step of prohibiting an automatic stop of the engine if it is detected that the operating condition is within the first region.

The recording medium of the invention is a computer-readable recording medium in which a program for causing a computer to execute any one of the above-described control methods is recorded.

The voltage generator device of the invention maintains the voltage raising operation as much as possible even if the operating condition is in a region apart from an ordinary operating condition. Therefore, normal functions of the electric loads connected to the voltage raising device can be maintained as best as possible.

If the output current exceeds a pre-set maximum rated value of current, the output voltage is reduced in accordance with increase in the value of current. Therefore, even in the case of overcurrent, voltage compensation can be attained for a short time of starting the engine, and a vehicle failure can be prevented.

Furthermore, in the case of low voltage, the switching operation is stopped, so that destruction of an element or the like due to heat can be prevented.

Furthermore, if the output voltage exceeds a pre-set maximum value of overvoltage, the switching operation is intermittently performed. Therefore, even in the case of overvoltage, predetermined output voltage can be maintained, and voltage compensation can be attained for a short time of starting the engine.

Furthermore, after a control at the time of overcurrent/overvoltage, a warning signal is output and the idle stop is prohibited. Therefore, the voltage generator device can be protected, and the resetting or the like of electric loads of the vehicle can be prevented. Hence, the possibility that the engine can be started at least once without a problem is increased.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION

Figure 1:
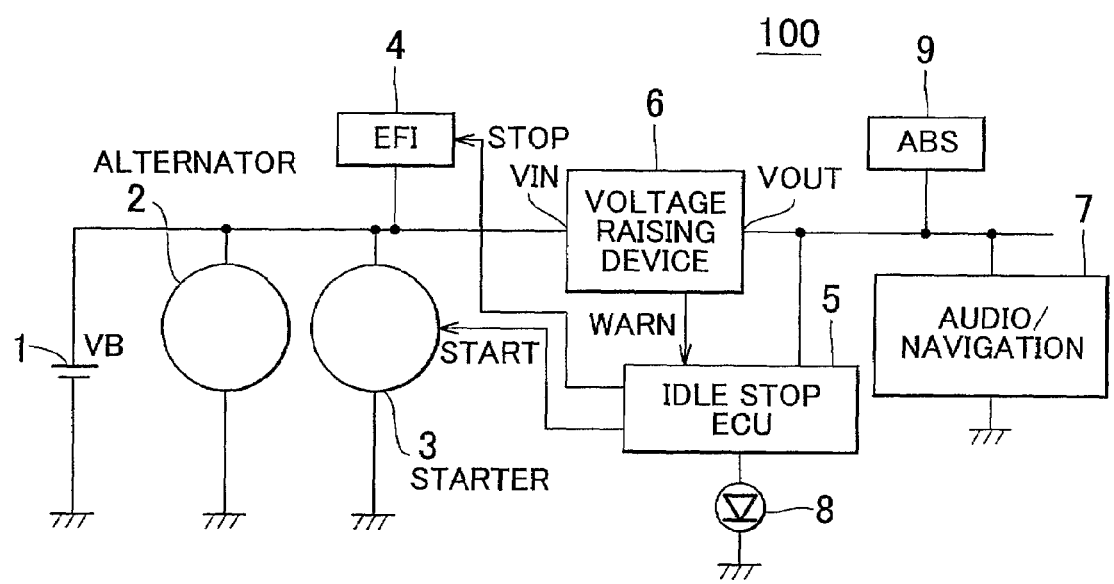
FIG. 1 is a schematic block diagram of an electric system installed in a motor vehicle according to an embodiment of the invention.

In the following description, the invention will be described in more detail in terms of exemplary embodiments.

Hereinafter, embodiments of the invention will be described with reference to the accompanying drawings. The same or similar portions are represented by the same reference characters in the drawings, and will not be redundantly described below.

FIG. 1 is a schematic block diagram of an electric system installed in a motor vehicle according to an embodiment of the invention.

Referring to FIG. 1, an electric system 100 includes a battery 1, an alternator 2, a starter 3, an EFI (electronic fuel injection) control unit 4, and a voltage raising device 6. The alternator 2, the starter 3, the EFI control unit 4 and the voltage raising device 6 are connected to the positive electrode of the battery 1. The voltage raising device 6 is a voltage generator device that generates and outputs a target voltage that is higher than the input voltage.

The electric system 100 further includes an idle stop ECU (electrical control unit) 5, an audio/navigation device 7 and an ABS (anti-lock brake system) control unit 9 that are connected to an output of the voltage raising device 6 and that are supplied with a power supply electric current. The electric system 100 also includes an LED (light-emitting diode) 8 for indicating a warning to a driver which is connected to the idle stop ECU 5.

The alternator 2 receives a power supply voltage VB from the battery 1, and supplies the voltage to a built-in rotor to create a magnetic field. Furthermore, when receiving power from an engine (not shown), the alternator 2 allows the rotor to rotate so as to induce alternating-current electric power in a stator provided around the rotor. Still further, using a built-in diode, the alternator 2 rectifies the induced alternating-current power, and thus converts the alternating-current power into direct-current power. The converted direct-current power is supplied to the battery 1 to charge the battery 1.

The starter 3 is actuated by the power supply voltage VB from the battery 1 so as to start the engine.

The EFI control unit 4 controls the supply of fuel to the engine. The voltage raising device 6 receives the power supply voltage of the battery 1 as an input voltage VIN, and raises the voltage, and outputs the raised voltage as an output voltage VOUT. The output voltage VOUT is supplied to electric loads such as the ABS control unit 9, the audio/navigation device 7, the idle stop ECU 5, etc.

The voltage raising device 6, as described in detail below, is designed so as to be able to supply the output voltage VOUT to the electric loads as much as possible. Therefore, even if the operating region deviates from a normal region to some extent, the electric power supply is maintained so as to allow normal operation of electric loads and, particularly, of electric loads that play important roles in the driving of the vehicle, such as the ABS control unit 9 and the like.

The idle stop ECU 5 outputs an engine stop control signal STOP to the EFI control unit 4 when an engine stopping condition is fulfilled. Furthermore, if an engine starting condition is fulfilled after the engine stops, the idle stop ECU 5 outputs an engine start control signal START to the starter 3 so as to start the engine. If a warning signal WARN is transmitted from the voltage raising device 6, the idle stop ECU 5 discontinues the idle stop control, and avoids outputting a control signal STOP. In that case, the idle stop ECU 5 turns on the LED 8 in order to indicate a warning to a driver. The warning indication to a driver may be accomplished by other methods.

Figure 2:
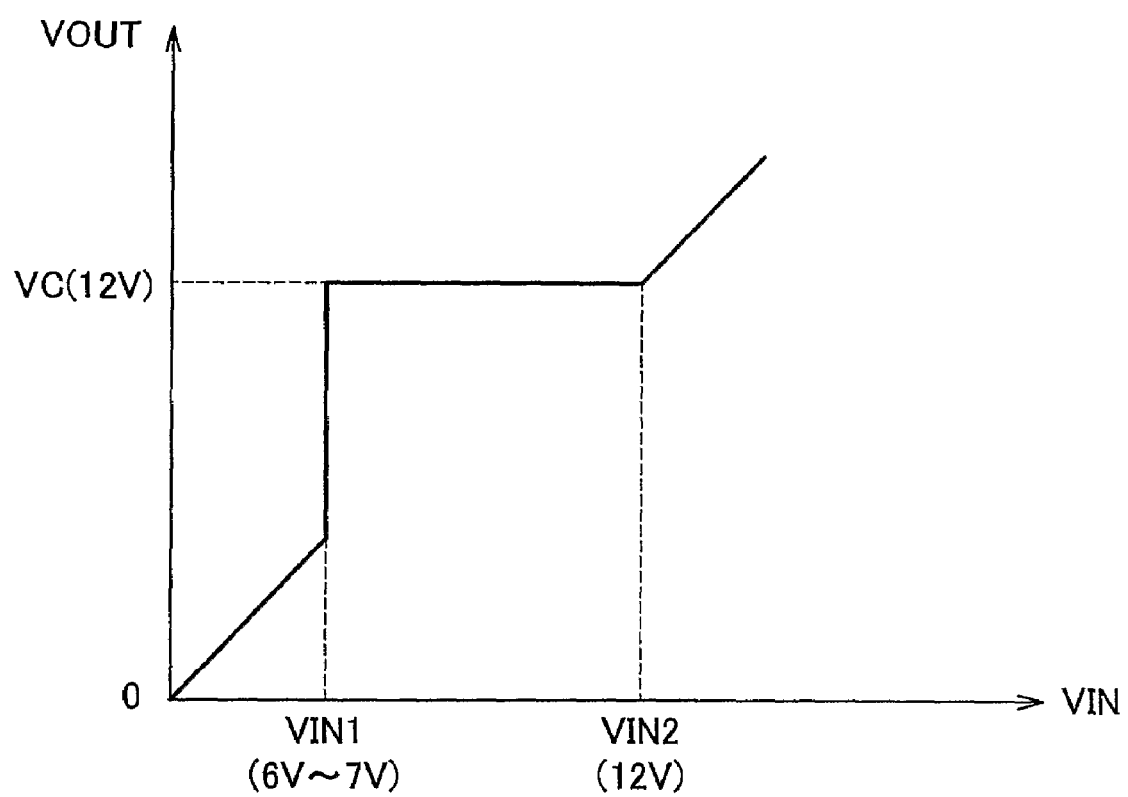
FIG. 2 is a diagram for briefly describing an input-output characteristic of a voltage raising device during a normal operation thereof.

FIG. 2 is a diagram for briefly describing the input-output characteristic of the voltage raising device 6 during a normal operation thereof.

Referring to FIGS. 1 and 2, the voltage raising device 6 stops its internal switching operation, and outputs a voltage substantially equal to the input voltage via a built-in coil, in the case where the battery voltage is within the range of 0 V to a voltage VIN1 V and the case where the battery voltage is greater than or equal to a voltage VIN2 V.

If the input voltage is within the voltage range of VIN1 to VIN2, the voltage raising device 6 raises the input voltage to a constant voltage VC, and outputs the constant voltage VC as the output voltage VOUT.

During an ordinary run of the vehicle, the input voltage VIN is higher than the voltage VIN2 due to the electricity generation performed by the alternator 2. Furthermore, if the battery 1 is sufficiently charged and the electric current consumption of the loads is not great, the input voltage VIN is also greater than the voltage VIN2. Therefore, during an ordinary operation, the voltage raising device 6 does not perform the switching, but is used merely as a passage of electric current.

In contrast, if the input voltage VIN drops to the range of VIN1 to VIN2 as the power supply voltage of the battery falls due to great power consumption by electric loads as in the case where the engine is started after an idle stop, the voltage raising device 6 raises the input voltage VIN to the output voltage VC, and outputs the output voltage VC.

For example, it is desirable that the voltage VIN1 be set at, for example, about 6V to 7 V, below the reset voltage of 8V of the CPU contained in an electric load, and that the voltage VIN2 be set at about a normal output voltage of 12 V of the battery 1 which is lower than the generated voltage of the alternator 2. Furthermore, it is preferable that the constant voltage VC be also set at about the normal output voltage of 12 V of the battery 1.

Figure 3:
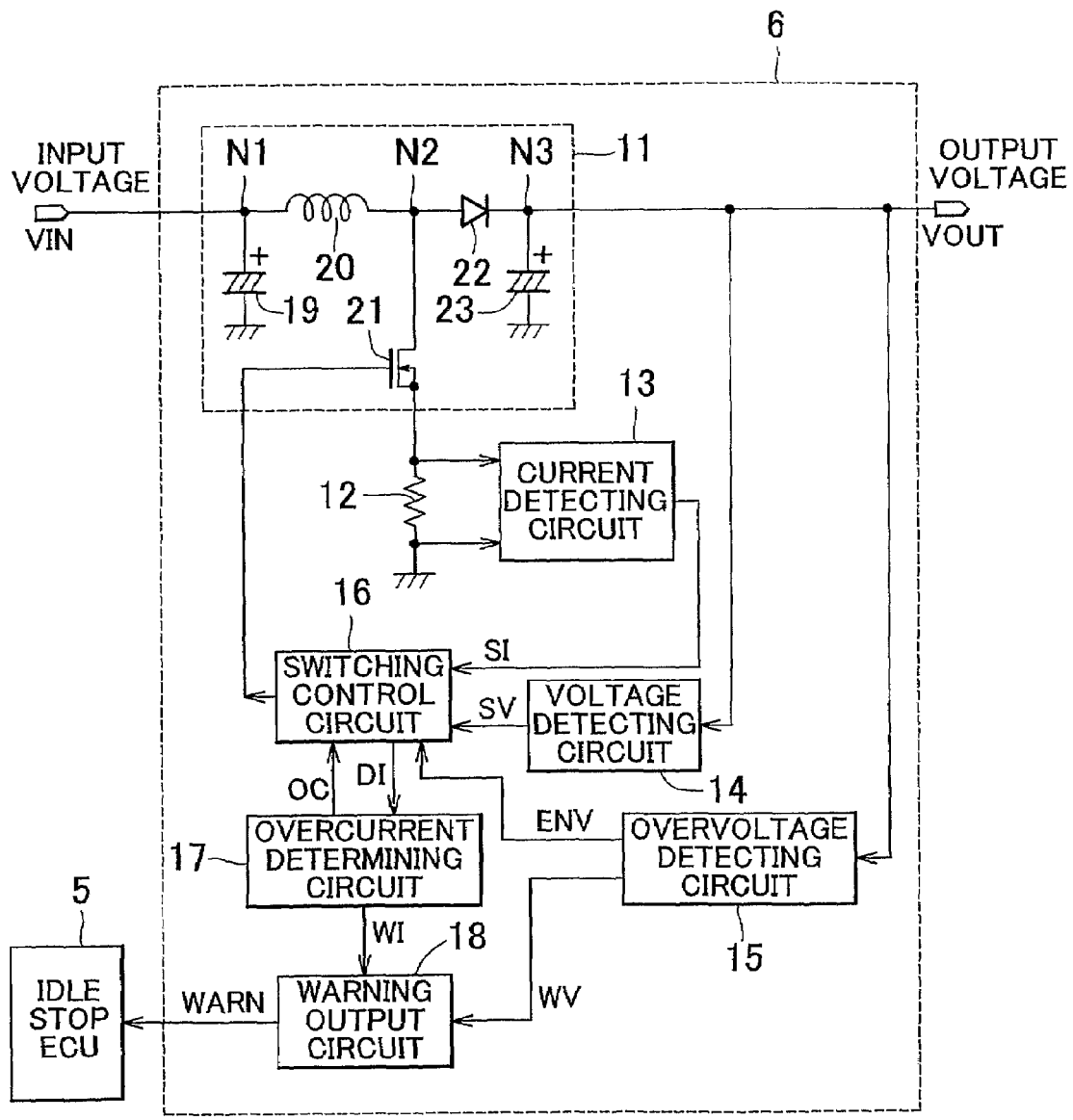
FIG. 3 is a block diagram for describing a construction of the voltage raising device shown in FIG. 1.

FIG. 3 is a block diagram for describing a construction of the voltage raising device 6 shown in FIG. 1.

Referring to FIG. 3, the voltage raising device 6 includes a switching circuit 11 that receives the input voltage VIN, and raises it, and outputs the output voltage VOUT, a shunt resistor 12 for monitoring the current through the switching circuit 11, a current detecting circuit 13 that observes the voltage across the shunt resistor 12 to detect current therethrough, and outputs a current detection signal SI, a voltage detecting circuit 14 that observes the output voltage VOUT and outputs a voltage detection signal SV, and a switching control circuit 16 that performs a switching control in accordance with the current detection signal SI and the voltage detection signal SV.

The switching circuit 11 includes an electrolytic capacitor 19 connected between a ground node and a node N1 to which the input voltage VIN is given, a coil 20 connected between the node N1 and a node N2, a diode 22 connected between the node N2 and a node N3 from which the output voltage VOUT is output, an electrolytic capacitor 23 connected between the node N3 and a ground node, and a field-effect transistor 21 connected in series with the shunt resistor 12 between the node N2 and the ground node. The gate potential of the field-effect transistor 21 is controlled by the switching control circuit 16.

The voltage raising device 6 further includes an overvoltage detecting circuit 15 that detects whether or not the output voltage VOUT is greater than a predetermined overvoltage, an overcurrent determining circuit 17 that determines whether or not the current through the switching circuit 11 is greater than a predetermined overcurrent, and a warning output circuit 18 that outputs a warning signal WARN to the idle stop ECU 5 if the overcurrent determining circuit 17 has output an overcurrent detection signal WI or if the overvoltage detecting circuit 15 has detected an overvoltage detection signal WV.

The operation of the voltage raising device 6 will be briefly described below.

When the field-effect transistor 21 in the switching circuit 11 becomes conductive, current flows from the node N1 to the ground node via the coil 20 and the transistor 21. During the conductive period of the transistor 21, energy is stored in the coil 20.

As the transistor 21 changes from the conductive state to a non-conductive state, the energy stored in the coil 20 up to the moment is released. If this results in the electric potential of the node N2 being higher than that of the node N3, forward current flows through the diode 22. If the forward current exceeds the amount of current consumed by the node N3, the electric potential of the node N3 rises.

The switching control circuit 16 has, for example, a transmitter circuit therein, and therefore makes the field-effect transistor 21 conductive in a predetermined cycle. The period of conduction of the transistor 21 is determined by monitoring the current detection signal SI output by the current detecting circuit 13 and the voltage detection signal SV output by the voltage detecting circuit 14.

Hence, during an ordinary operation, the switching control circuit 16 detects the present value of the output voltage VOUT, and detects how much energy presently needs to be stored in the coil 20 or how much energy is presently stored therein, and therefore determines how long the conduction through the transistor 21 needs to be continued, and accordingly controls the on/off duty ratio of the field-effect transistor 21.

Thus, the switching control circuit 16 performs a first feedback control by using the current detecting circuit 13 and the voltage detecting circuit 14.

The switching control circuit 16 also performs a second feedback control in case of occurrence of an abnormality in the first feedback control. That is, if the overvoltage detecting circuit 15 detects overvoltage and outputs a switching prohibition signal ENV, the switching control circuit 16 stops the switching operation of the transistor 21. As a result, the voltage raising operation performed by the switching circuit 11 stops.

If the overcurrent determining circuit 17 receives from the switching control circuit 16 a signal DI that indicates the on/off duty ratio of the transistor 21, and determines that the conductive period of the transistor 21 is longer than a predetermined value and therefore that the voltage raising capability of the switching circuit 11 is approaching its limit, then the overcurrent determining circuit 17 outputs an overcurrent determination signal OC. Upon detection of overcurrent, the switching control circuit 16 makes the target voltage of the voltage raising operation lower than a predetermined value, and accordingly causes execution of the voltage raising operation so that the value of current reduces.

Although in FIG. 3, the overcurrent determining circuit 17 detects the overcurrent by receiving from the switching control circuit 16 a signal DI that indicates the on/off duty ratio of the transistor 21, the overcurrent may instead be detected through the provision of a shunt resistor or a Hall element between the node N3 and an electric load connected thereto.

Figure 4:
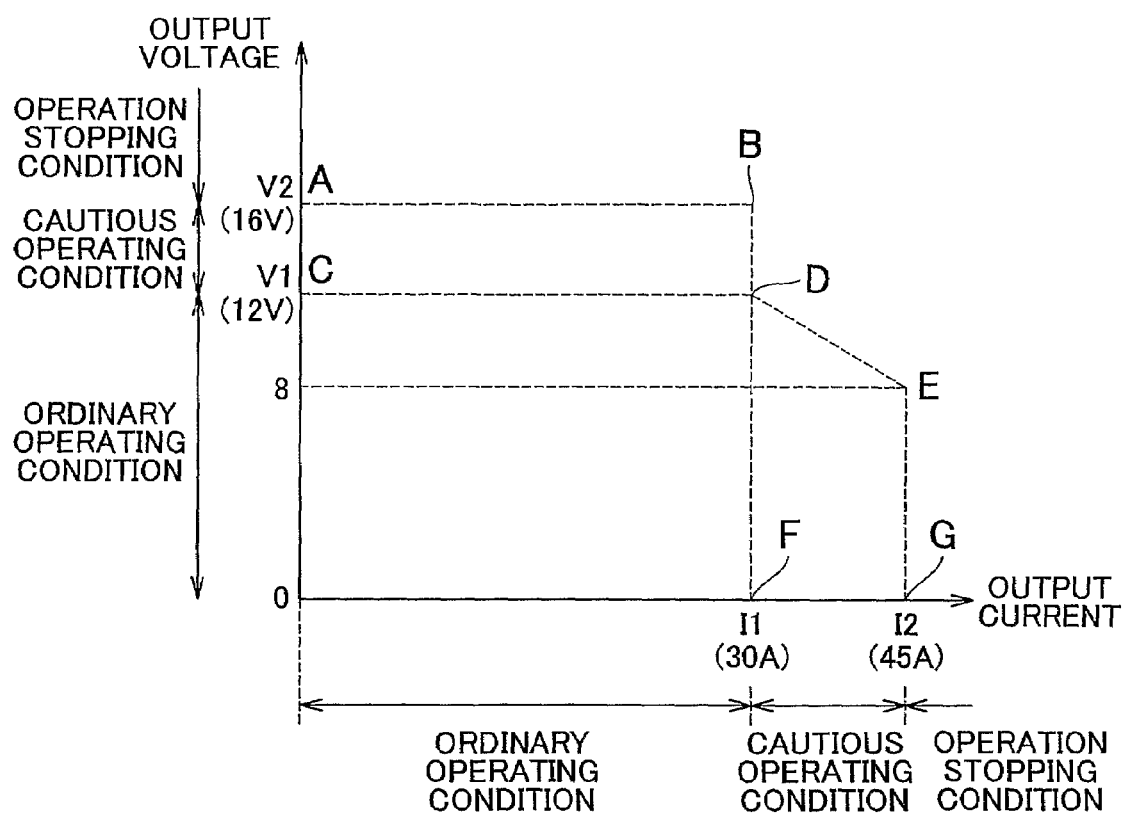
FIG. 4 is a diagram for describing a specific example of an operating condition of the voltage raising device.

FIG. 4 is a diagram for describing a specific example of the operating condition of the voltage raising device.

Referring to FIG. 4, the range of output current of 0 A to 30 A is defined as an ordinary operating condition, and the range of output current of 30 A to 45 A is defined as an cautious operating condition, and the range of output current above 45 A is defined as an operation stopping condition. With regard to voltage, the range of output voltage of 0 V to 12 V is defined as an ordinary operating condition, and the range of output voltage of 12 V to 16 V is defined as a cautious operating condition, and the range of output voltage above 16 V is defined as an operation stopping condition.

If there is no abnormality in the voltage raising device 6 or any one of the electric loads connected thereto, the operating point is any point on a line segment CD.

The case where an overcurrent has occurred refers to a case where the current consumed by a load connected to the output of the voltage raising device has increased due to a quasi-contact of a harness or the like. In that case, if the output current increases, a reduction of the target value of the voltage raise will maintain a certain voltage raising operation. For example, if the maximum value of the voltage raising capability of the switching circuit 11 is at point D, the voltage raising operation is maintained by reducing the output voltage within such an extent that the present electric power is not exceeded. That is, during the overcurrent state of the output current, the operating point exists on a line segment DE.

If the voltage is reduced below point E, the generated voltage of the voltage raising device becomes lower than the reset voltage of 8 V of the CPU of the electric load. Therefore, the advantage of the voltage raising operation disappears, and the operation is stopped. In FIG. 4, 45 A by 8 V is equivalent to the electric power of 30 A by 12 V, and 45 A is indicated as an example of I2.

Next, conditions in which the output voltage becomes overvoltage will be described. During an ordinary operation, the target value of the raised voltage of the voltage raising device is 12 V, and therefore the output voltage does not exceed 12 V. However, if the current detecting circuit 13 or the voltage detecting circuit 14 in FIG. 3 has a great detection error or an offset in the detected value, the output voltage may exceed 12 V.

In such a case, the voltage raising operation is maintained despite deviation of the output voltage from a normal range, substantially as long as the output voltage does not exceed 16 V. In this case, the operating point is within the region between the line segment AB and the line segment CD. However, if the output voltage exceeds 16 V, there arises a possibility that the withstanding voltage of an electric load connected to the output of the voltage raising device may be exceeded, and therefore the operation is stopped.

Figure 5:
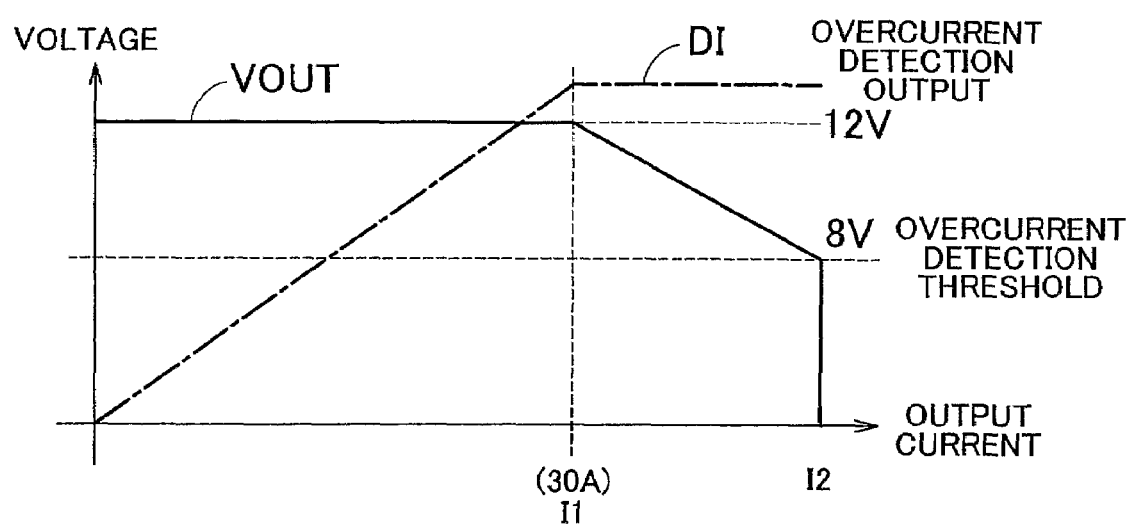
FIG. 5 is a waveform diagram for describing the operation of the voltage raising device in the case where an overcurrent has occurred.

FIG. 5 is a waveform diagram for describing the operation of the voltage raising device in the case where an overcurrent has occurred.

Referring to FIG. 5, as long as the output current does not exceed, for example, 30 A, the output voltage VOUT remains at a predetermined target value of, for example, 12 V. During that state, as the output current increases, the value of the overcurrent detection output signal DI output by the switching control circuit 16 shown in FIG. 3 also increases.

When the value of the overcurrent detection output signal DI reaches a value corresponding to a current of 30 A, the overcurrent determining circuit 17 outputs a signal OC to the switching control circuit 16, thereby commanding the circuit 16 to reduce the target voltage of the voltage raising operation in accordance with the increase in the value of current.

Hence, if the output current exceeds 30 A, the switching control circuit 16 reduces the voltage by reducing the duty ratio of the switching. If the output voltage reduces to or below 8 V, the operation of the voltage raising device 6 is stopped because, under this condition of output voltage, the reset voltage of the CPU of an electric load connected to the output of the voltage raising device 6 is fell short of and the continued operation of the voltage raising device 6 will cause a failure of the load.

Figure 6:
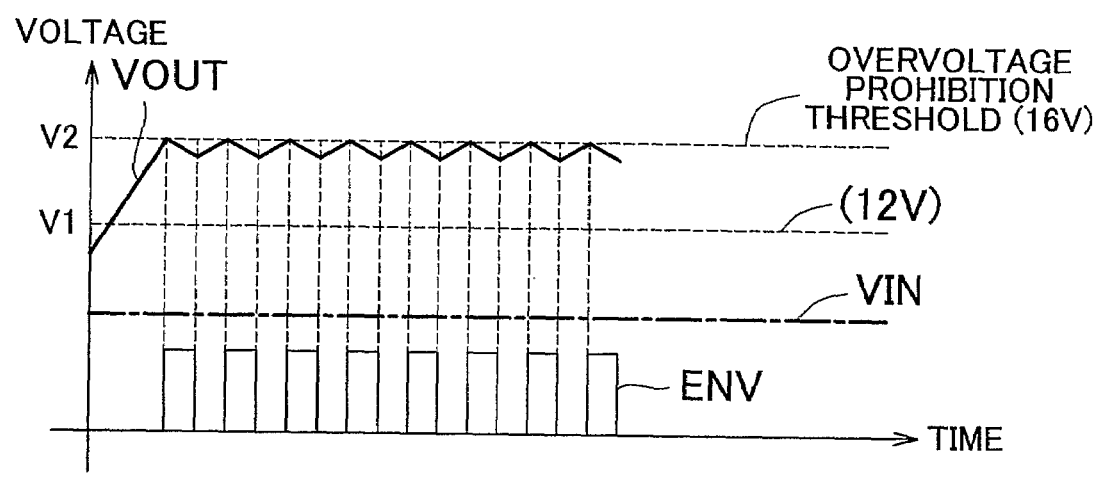
FIG. 6 is a waveform diagram of the operation of the voltage raising device during overvoltage.

FIG. 6 is a waveform diagram of the operation of the voltage raising device during overvoltage.

As indicated in FIG. 6, after the raising of the input voltage VIN is started for some reason, the output voltage VOUT may sometimes exceed the target value, for example, 12 V, and may reach the overvoltage prohibition threshold value of 16 V. If, due to an abnormality, the output voltage VOUT exceeds the target voltage and reaches the overvoltage prohibition threshold value, the overvoltage detecting circuit 15 shown in FIG. 3 activates the switching prohibition signal ENV. As a result, the switching control circuit 16 turns off the transistor 21, so that the output voltage VOUT decreases as current is consumed by a load provided on the output side.

Then, the overvoltage detecting circuit 15 deactivates the prohibition signal ENV, so that the switching control circuit 16 starts the switching of the transistor 21 again. As a result, the output voltage VOUT rises. As this operation is repeatedly performed, the switching circuit 11 intermittently performs the voltage raising operation.

Figure 7:
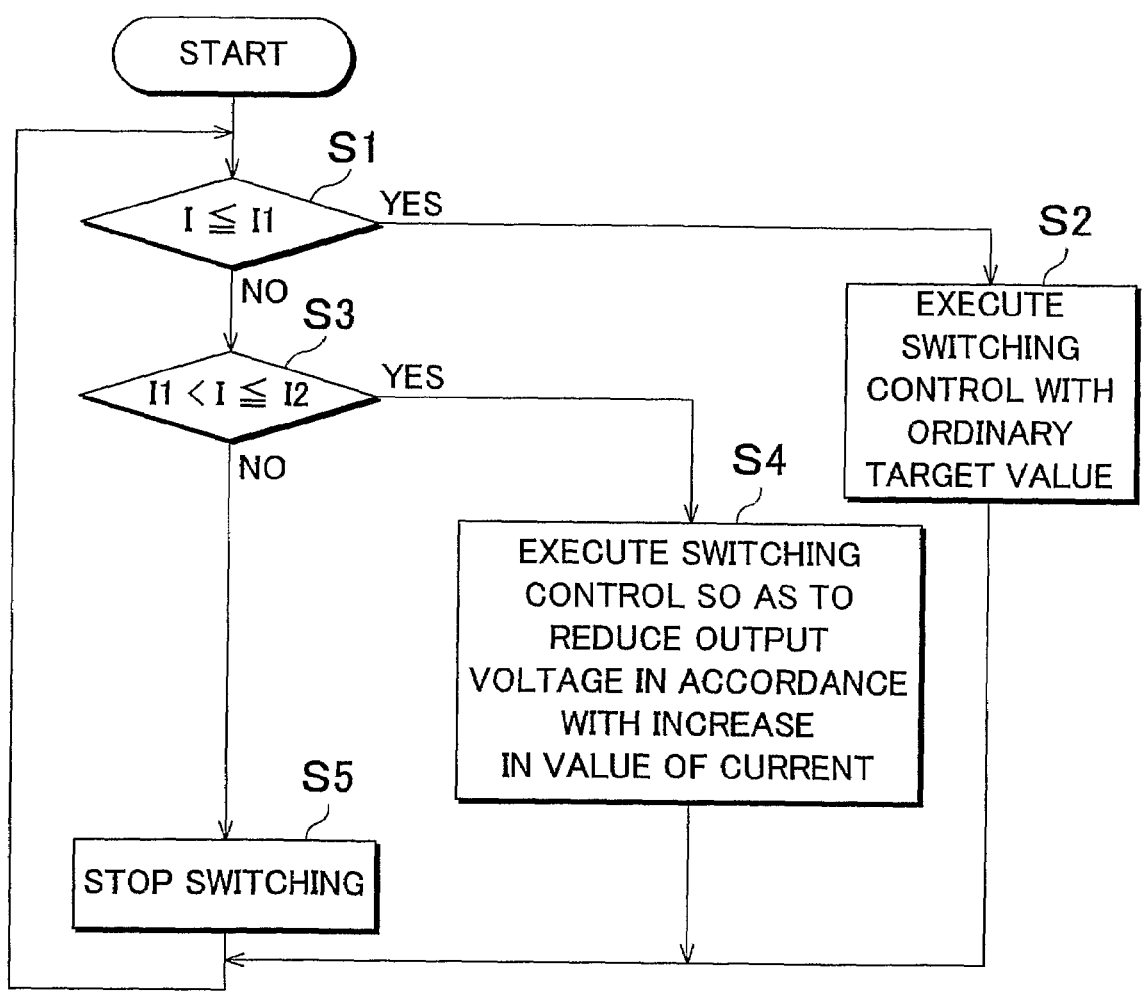
FIG. 7 is a flowchart for describing the operation of a switching control circuit shown in FIG. 3 during overcurrent.

FIG. 7 is a flowchart for describing the operation of the switching control circuit 16 shown in FIG. 3 during overcurrent.

Referring to FIG. 7, after the operation starts, it is determined in step S1 whether the value of current I through the switching circuit 11 is less than or equal to a current I1. If the value of current I is less than or equal to I1, the process proceeds to step S2, in which the target value of the output voltage is set at an ordinary target value (e.g., 12 V) and the switching control is performed.

Conversely, if it is determined in step S1 that the value of current I is greater than the value of current I1, the process proceeds to step S3. In step S3, it is determined whether the value of current I, which is now greater than I1, is less than or equal to a value of current I2.

If it is determined in step S3 that I1<I≦I2, the process proceeds to step S4, in which the switching control circuit 16 performs the switching control so as to decrease the output voltage in accordance with the increase in the value of current.

Conversely, if it is determined in step S3 that I1<I≦I2 is not the case, that is, if it is determined that I>I2, the process proceeds to step S5, in which the switching operation is stopped. After step S2, S4 or S5 is completed, the process returns to the observation of the value of current in step S1.

Through this control, the voltage raising operation based on the operation waveform shown in FIG. 5 is performed.

Figure 8:
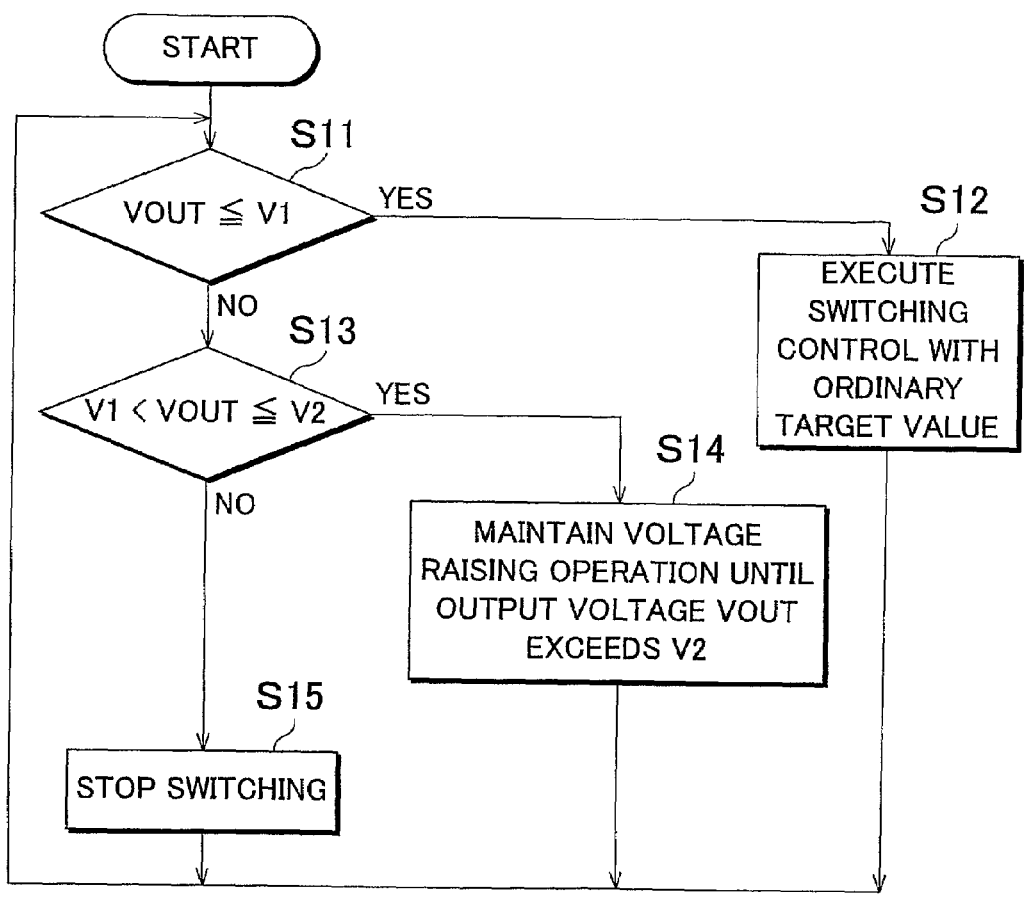
FIG. 8 is a flowchart for describing the operation of the switching control circuit shown in FIG. 3 which is performed in response to overvoltage.

FIG. 8 is a flowchart for describing the operation of the switching control circuit 16 shown in FIG. 3 which is performed in response to overvoltage.

Referring to FIG. 8, after the control starts, it is determined in step S11 whether the output voltage VOUT≦V1. If VOUT≦V1, the process proceeds to step S12, in which the switching control circuit 16 sets the target value of output voltage at an ordinary target value, for example, 12 V, and performs the switching control.

Conversely, if it is determined in step S11 that VOUT≦V1 is not the case, the process proceeds to step S13, in which it is determined whether V1<VOUT≦V2. If it is determined in step S13 that V1<VOUT≦V2 is fulfilled, the process proceeds to step S14, in which the present voltage raising operation is maintained until the output voltage VOUT exceeds the voltage V2.

Conversely, if it is determined in step S13 that V1<VOUT≦V2 is not fulfilled, which means that the output voltage VOUT is greater than V2, the process proceeds to step S15, in which the switching is stopped. After step S12, S14 or S15 is completed, the process returns to step S11, in which determination regarding voltage is performed. Through the execution of the foregoing operation, the operation waveform shown in FIG. 6 is observed.

If the switching control circuit 16 shown in FIG. 3 is realized by a computer, the switching control circuit 16 is equipped with a built-in ROM (read-only memory) in which programs for causing operations illustrated by the flowcharts of FIGS. 7 and 8 have been written.

Figure 9:
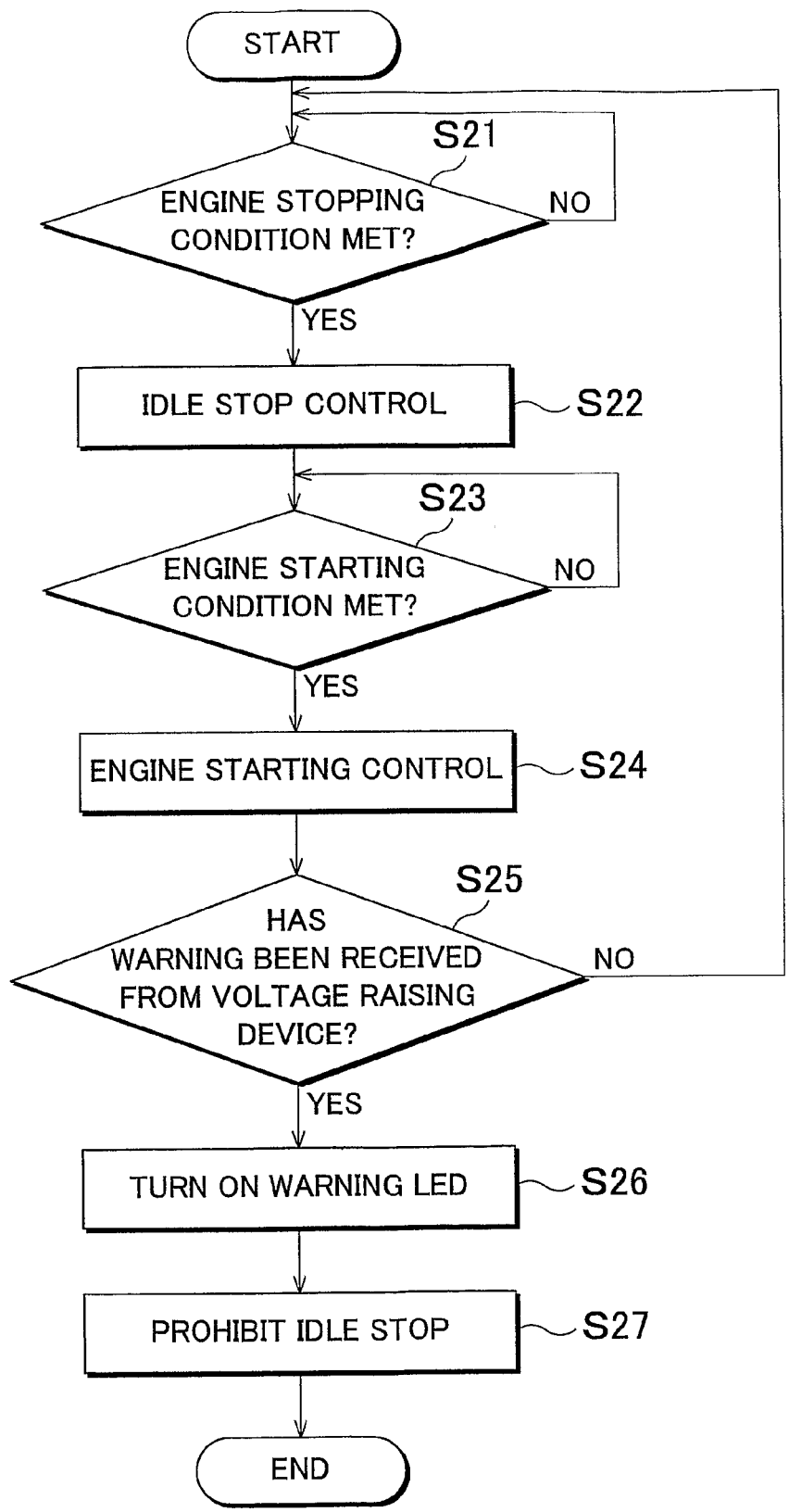
FIG. 9 is a flowchart for describing a control operation of an idle stop ECU shown in FIG. 1.
Figure 10:
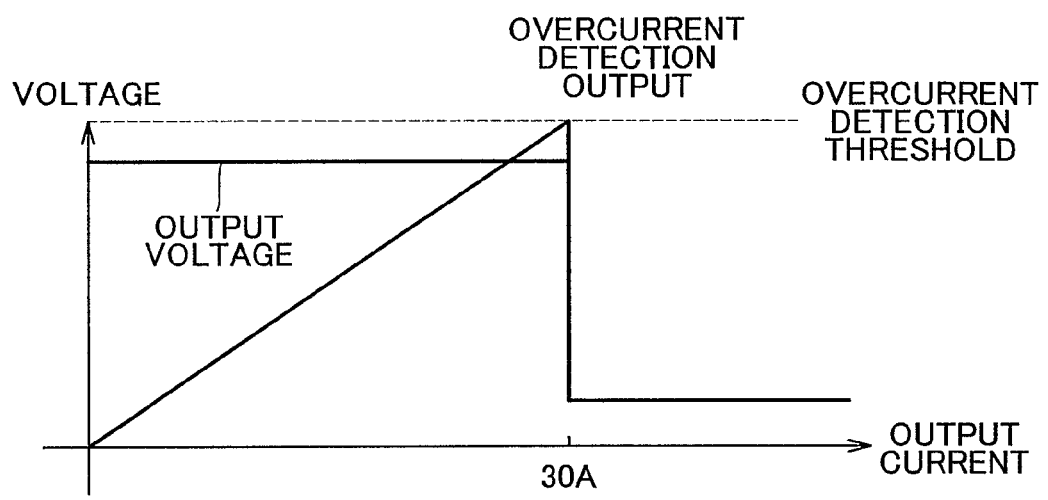
FIG. 10 is a waveform diagram for describing the output during overcurrent in a related-art technology.
Figure 11:
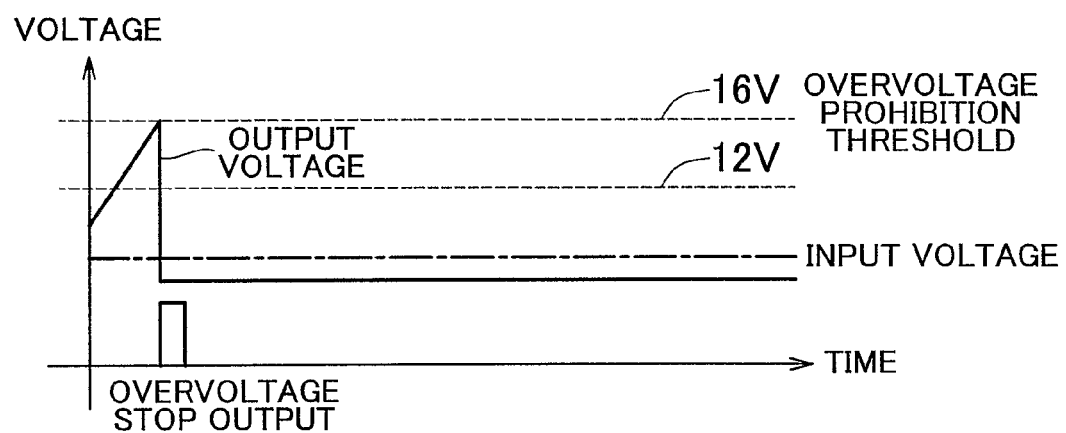
FIG. 11 is a waveform diagram for describing a control performed during overvoltage in the related-art technology.

FIG. 9 is a flowchart for describing a control operation of the idle stop ECU 5 shown in FIG. 1.

Referring to FIG. 9, after the control starts, it is determined in step S21 whether an engine stopping condition is fulfilled. The fulfillment of the engine stopping condition is determined, for example, if the remaining charge of the battery is greater than or equal to a predetermined value, or if the motor vehicle has a vehicle speed history that indicates the running of at least a predetermined distance, or if the upslope angle is within a predetermined angle in the case where the motor vehicle is running uphill, or the like.

If it is determined in step S21 that the engine stopping condition is not fulfilled, the fulfillment of the engine stopping condition is awaited. Conversely, if it is determined in step S21 that the engine stopping condition is fulfilled, the idle stop control is performed in step S22. Specifically, the idle stop ECU 5 shown in FIG. 1 outputs a signal STOP commanding the EFI control unit 4 to stop the supply of fuel.

After the end of step S22, the process proceeds to step S23, in which it is observed whether an engine starting condition is fulfilled. The fulfillment of the condition for starting the engine after an idle stop is determined on the basis of the off-state of the brake pedal and the on-state of the accelerator.

If it is determined in step S23 that the engine starting condition is not fulfilled, the fulfillment of the engine starting condition is awaited. Conversely, if it is determined in step S23 that the engine starting condition is fulfilled, the process proceeds to step S24, in which an engine starting control is performed.

Specifically, the idle stop ECU 5 outputs to the starter 3 a signal START that commands the starter 3 to start the engine. After step S24 is completed, that is, after the engine is started, the process proceeds to step S25. In step S25, it is determined whether the idle stop ECU 5 has received a warning signal WARN from the voltage raising device 6 up to the present time.

If it is determined in step S25 that the idle stop ECU 5 has not received the warning up to the present, the process returns to step S21, in which the idle stop ECU 5 waits for the fulfillment of the engine stopping condition. Conversely, if it is determined in step S25 that the idle stop ECU 5 has received the warning signal WARN from the voltage raising device 6, the idle stop ECU 5 proceeds to step S26. In step S26, the idle stop ECU 5 turns on the warning LED 8 in order to indicate an abnormality to the driver. The lighting of the LED in step S26 is not essential, but other measures may be taken to indicate an abnormality to the driver.

Subsequently in step S27, the idle stop ECU 5 prohibits the idle stop control from then on. Therefore, if the engine stopping condition is fulfilled during a wait for a traffic signal or the like, the engine will not be stopped, so that the reduction in the battery voltage due to the power consumed by the starter 3 will be avoided and the operation of the voltage raising device 6 will also be avoided. Hence, the driver is allowed to drive the vehicle having an abnormality to a repair shop or the like.

If the idle stop ECU 5 shown in FIG. 1 is realized by a computer, the idle stop ECU 5 is equipped with a built-in ROM (read-only memory) in which a program for causing an operation as illustrated by the flowchart of FIG. 9 has been written.

The embodiments disclosed above should be considered to be merely illustrative in all respects and not restrictive at all. The scope of the invention is not restricted by the foregoing description of embodiments, but is defined only by the appended claims, and is intended to cover all modifications within the scope of the appended claims and equivalents thereto.

The invention claimed is:

1. A voltage generator device comprising:
   a voltage generating portion that receives an input voltage and generates a target voltage;
   an observing portion that observes an operating condition of the voltage generating portion; and
   a control portion which causes the voltage generating portion to maintain a voltage generating operation even if the operating condition observed by the observing portion is within a first region that is apart from a normal region, and which causes the voltage generating portion to stop the voltage generating operation if the operating condition observed is within a second region that is further apart from the normal region than the first region is, wherein
   the voltage generator device is capable to attain a voltage compensation by raising an output voltage when a battery voltage decreases at the time of restart of an engine after an idle stop, wherein,
   if an output current exceeds a first value of current, the output voltage is reduced, or
   if the output voltage exceeds a first value of voltage, a switching operation of the voltage generating portion is intermittently performed.

2. The voltage generator device according to claim 1, wherein the operating condition is within the first region if a current through the voltage generating portion is greater than a first value of current and is less than or equal to a second value of current, and the operating condition is within the second region if the current through the voltage generating portion is greater than the second value of current.

3. The voltage generator device according to claim 2, wherein the control portion reduces a target value of voltage output by the voltage generating portion if a value of current through the voltage generating portion increases provided that the operating condition is within the first region.

4. The voltage generator device according to claim 1, wherein the operating condition is within the first region if a voltage output by the voltage generating portion is greater than a first value of voltage and is less than or equal to a second value of voltage, and the operating condition is within the second region if the voltage output by the voltage generating portion is greater than the second value of voltage.

5. The voltage generator device according to claim 4,
wherein the observing portion includes a voltage detecting circuit (14) that detects the first value of voltage, and an overvoltage detecting circuit that detects the second value of voltage, and
wherein the control portion performs on the voltage generating portion (11) a feedback control of setting an output of the voltage generating portion at the target voltage in accordance with an output of the voltage detecting circuit, and stops the feedback control in accordance with an output of the overvoltage detecting circuit and prohibits the voltage generating portion from performing the voltage generating operation.

6. A motor vehicle comprising:
an electricity storage portion;
a voltage generator device that compensates for a fall of an output voltage of the electricity storage portion, and
an automatic engine stop control device that automatically controls stopping and starting of an engine,
wherein the voltage generator device includes a voltage generating portion that receives an input voltage and generates a target voltage, an observing portion that observes an operating condition of the voltage generating portion, and a control portion which causes the voltage generating portion to maintain a voltage generating operation even if the operating condition observed by the observing portion is within a first region that is apart from a normal region, and which causes the voltage generating portion to stop the voltage generating operation if the operating condition observed is within a second region that is further apart from the normal region than the first region is, and
wherein the automatic engine stop control device prohibits an automatic stop of the engine if it is detected that the operating condition is within the first region, and wherein
the voltage generator device is capable to attain a voltage compensation by raising an output voltage when a battery voltage decreases at the time of restart of an engine after an idle stop, wherein,
if an output current exceeds a first value of current, the output voltage is reduced, or,
if the output voltage exceeds a first value of voltage, a switching operation of the voltage generating portion is intermittently performed.

7. A control method for a voltage generator device comprising the steps of:
observing an operating condition of the voltage generating portion, which receives an input voltage and generates a target voltage, and causing the voltage generating portion to maintain a voltage generating operation even if the operating condition is within a first region that is apart from a normal region; and
causing the voltage generating portion to stop the voltage generating operation if the operating condition observed is within a second region that is further apart from the normal region than the first region is, wherein the voltage generator device attains a voltage compensation by raising an output voltage when a battery voltage decreases at the time of restart of an engine after an idle stop, wherein,
if an output current exceeds a first value of current, the output voltage is reduced, or,
if the output voltage exceeds a first value of voltage, a switching operation of the voltage generating portion is intermittently performed.

8. The control method for the voltage generator device according to claim 7, wherein the operating condition is within the first region if a current through the voltage generating portion is greater than a first value of current and is less than or equal to a second value of current, and the operating condition is within the second region if the current through the voltage generating portion is greater than the second value of current.

9. The control method for the voltage generator device according to claim 8, wherein a target value of voltage output by the voltage generating portion is reduced if a value of current through the voltage generating portion increases provided that the operating condition is within the first region.

10. The control method for the voltage generator device according to claim 7, wherein the operating condition is within the first region if a voltage output by the voltage generating portion is greater than a first value of voltage and is less than or equal to a second value of voltage, and the operating condition is within the second region if the voltage output by the voltage generating portion is greater than the second value of voltage.

11. The control method for the voltage generator device according to claim 10,
wherein the voltage generator device includes a voltage detecting circuit that detects the first value of voltage, and an overvoltage detecting circuit that detects the second value of voltage, and
wherein the control method further comprises the step of performing on the voltage generating portion a feedback control of setting an output of the voltage generating portion at the target voltage in accordance with an output of the voltage detecting circuit, and the step of stopping the feedback control in accordance with an output of the overvoltage detecting circuit (15) and prohibiting the voltage generating portion from performing an operation.

12. A control method for a motor vehicle comprising the steps of:
observing an operating condition of the voltage generator device, which compensates for a change in an output voltage of an electricity storage device, and causing the voltage generator device to maintain a voltage generating operation even if the operating condition is within a first region that is apart from a normal region;

controlling stopping and starting of an engine in accordance with a state of the motor vehicle if the operating condition is within the normal region; and prohibiting an automatic stop of the engine if it is detected that the operating condition is within the first region, wherein the voltage generator device attains a voltage compensation by raising an output voltage when a battery voltage decreases at the time of restart of an engine after an idle stop, wherein, if an output current exceeds a first value of current, the output voltage is reduced, or, if the output voltage exceeds a first value of voltage, a switching operation of the voltage generating portion is intermittently performed.

13. A computer-readable recording medium in which a program for causing a computer to execute the control method for the voltage generator device according to claim 7 is recorded.

14. A computer-readable recording medium in which a program for causing a computer to execute the control method for the motor vehicle according to claim 12 is recorded.

* * * * *

UNITED STATES PATENT AND TRADEMARK OFFICE
CERTIFICATE OF CORRECTION

PATENT NO. : 7,471,069 B2  Page 1 of 1
APPLICATION NO. : 10/587331
DATED : December 30, 2008
INVENTOR(S) : Hironobu Kusafuka et al.

It is certified that error appears in the above-identified patent and that said Letters Patent is hereby corrected as shown below:

| Column | Line | |
|---|---|---|
| 2 | 19 | After "let it" insert --be--. |
| 2 | 56 | Change "abnoram-" to --abnormal- --. |
| 9 | 26 | Change "an cautious" to --a cautious--. |
| 10 | 28 | Change "is fell short of" to --is too low--. |
| 13 | 23 | After "circuit" delete "(14)". |
| 13 | 27 | After "portion" delete "(11)". |

Signed and Sealed this

Eleventh Day of August, 2009

David J. Kappos
*Director of the United States Patent and Trademark Office*